(12) United States Patent
Peirsman et al.

(10) Patent No.: US 9,777,150 B2
(45) Date of Patent: Oct. 3, 2017

(54) THERMOPLASTIC POLYESTER HAVING ENHANCED BARRIER AND IMPACT PROPERTIES

(71) Applicant: Anheuser-Busch InBev S.A., Brussels (BE)

(72) Inventors: Daniel Peirsman, Leuven (BE); Vanessa Valles, Leuven (BE); Ajay Godara, Leuven (BE)

(73) Assignee: Anheuser-Busch InBev S.A., Brussels (BE)

( * ) Notice: Subject to any disclaimer, the term of this patent is extended or adjusted under 35 U.S.C. 154(b) by 11 days.

(21) Appl. No.: 15/024,005

(22) PCT Filed: Sep. 23, 2014

(86) PCT No.: PCT/EP2014/070179
§ 371 (c)(1),
(2) Date: Mar. 22, 2016

(87) PCT Pub. No.: WO2015/040232
PCT Pub. Date: Mar. 26, 2015

(65) Prior Publication Data
US 2016/0237274 A1 Aug. 18, 2016

(30) Foreign Application Priority Data
Sep. 23, 2013 (EP) .................................. 13185529

(51) Int. Cl.
*C08L 67/02* (2006.01)
*B32B 1/02* (2006.01)
*B32B 27/36* (2006.01)
*C08K 3/24* (2006.01)
*C08L 77/06* (2006.01)

(52) U.S. Cl.
CPC ................ *C08L 67/02* (2013.01); *B32B 1/02* (2013.01); *B32B 27/36* (2013.01); *B32B 2367/00* (2013.01); *B32B 2439/00* (2013.01); *C08K 3/24* (2013.01); *C08L 77/06* (2013.01); *C08L 2201/14* (2013.01); *C08L 2203/10* (2013.01)

(58) Field of Classification Search
CPC ...... C08L 67/02; C08L 77/06; C08L 2201/14; C08L 2203/10; C08K 3/24; B32B 1/02; B32B 27/36; B32B 2367/00; B32B 2439/00
See application file for complete search history.

(56) References Cited

U.S. PATENT DOCUMENTS

| | | |
|---|---|---|
| 4,145,466 A | 3/1979 | Leslie et al. |
| 6,319,575 B1 | 11/2001 | Takashima et al. |
| 2006/0052504 A1 | 3/2006 | Xia et al. |

(Continued)

FOREIGN PATENT DOCUMENTS

| | | |
|---|---|---|
| CA | 2 694 861 | 5/2006 |
| EP | 1 173 508 | 11/2000 |

(Continued)

*Primary Examiner* — Michael C Miggins
(74) *Attorney, Agent, or Firm* — Levy & Grandinetti

(57) ABSTRACT

A polyester composition is suitable for food and beverage packaging. The polyester composition is obtained by blending: (a) 90-97 wt. % of a thermoplastic polyester selected from polyethylene terephthalate, polyethylene naphthalene, and mixtures thereof, (b) 2-6 wt. % of MXD6, (c) 1-5000 ppm of a cobalt salt, (d) 0.1-1000 ppm ethylene glycol (EG), and (e) 0.1-1000 ppm of pyromellitic dianhydride (PMDA).

14 Claims, 3 Drawing Sheets

(56) References Cited

U.S. PATENT DOCUMENTS

| | | |
|---|---|---|
| 2006/0105129 A1 | 5/2006 | Xia |
| 2006/0106192 A1 | 5/2006 | Xia |
| 2006/0199921 A1 | 9/2006 | Hale et al. |
| 2006/0226565 A1 | 10/2006 | Hale et al. |
| 2007/0066719 A1 | 3/2007 | Xia et al. |
| 2007/0260002 A1 | 11/2007 | Xia et al. |
| 2008/0161472 A1 | 7/2008 | Jenkins et al. |
| 2008/0255280 A1 | 10/2008 | Sims et al. |
| 2012/0199515 A1 | 8/2012 | Peters et al. |

FOREIGN PATENT DOCUMENTS

| | | |
|---|---|---|
| WO | WO 01/10947 | 2/2001 |
| WO | WO 2004/101666 | 11/2004 |
| WO | WO 2006/062816 | 6/2006 |
| WO | WO 2006/125823 | 11/2006 |
| WO | WO 2008/008813 | 1/2008 |

THERMOPLASTIC POLYESTER HAVING ENHANCED BARRIER AND IMPACT PROPERTIES

This Application is the U.S. National Phase of International Application Number PCT/EP2014/070179 filed on Sep. 23, 2014. which claims priority to European Application Number 13185529.8 filed Sep. 23, 2013.

TECHNICAL FIELD

The present invention relates to thermoplastic polyester material useful for packaging and, in particular, for food packaging and, more particularly, for blowmoulded containers for beverages. The polyester composition of the present invention allows the cost-effective production of containers having good gas barrier properties and at the same time having enhanced impact properties for a lower weight.

BACKGROUND FOR THE INVENTION

Thermoplastic polyesters, such as polyethylene terephthalate (PET), polyethylene naphthalene (PEN), and mixtures thereof, have been used extensively for packaging applications, in particular for food packaging. PET for example is widely used for producing bottles and other containers by blowmoulding a preform into its final shape.

For food preservation, oxygen diffusion from the atmosphere through one or several layers of thermoplastic polyester packaging must be slowed down and even stopped altogether to prevent it from oxidizing the food contained therein. Similarly, for containers containing carbonated or nitrogenated beverages, diffusion of carbon dioxide or nitrogen from inside to outside the container, through the container walls must be slowed down. Polymers in general have poor barrier properties against diffusion of gases such as oxygen, carbon dioxide, and nitrogen. Polyesters are no exception to this rule, and additives must be integrated into the polyester composition to enhance barrier properties. Such additives may be passive, simply hindering or blocking the passage of the gases, or they can be active scavengers, reacting with a gas such as oxygen. Several polyester compositions particularly suitable for food packaging and blowmoulded containers with enhanced barrier properties have been proposed in the prior art.

One commonly used additive is polyamide, as disclosed in US20060052504, US20080161472, US20060105129, WO200110947, US20060106192. A particularly suitable polyamide is MXD6 which represents a family of polyamides produced through polycondensation of meta-xylylene diamine (MXDA) with adipic acid and has been described as advantageous for enhancing gas barrier properties, as disclosed, e.g., in US20070260002, WO200662816, US20060226565, WO2006125823, US20060199921. MXD6 is an aliphatic polyamide resin which contains meta-xylylene groups in the molecule as shown below:

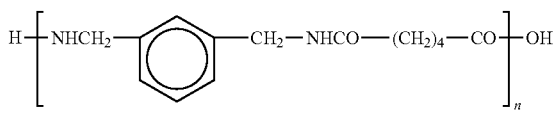

Transition metal salts, such as cobalt salts, can be added to the polyamide containing PET to catalyze and actively promote the oxidation of the polyamide polymer, thereby further enhancing the oxygen barrier characteristics of the package and thus acting as an active oxygen scavenger. The use of cobalt salts together with a polyamide is described in the foregoing references.

In EP1173508 it is proposed to add an additive comprising from 3 to about 8 hydroxylic groups to lower the level of acetaldehyde in the polymer. Such additives, however, are not described as affecting gas barrier properties of the polymer. Trifunctional or tetrafunctional comonomers such as trimellitic anhydride, trimethylol propane, pyromellitic dianhydride, pentaerythritol, and other polyester forming polyacids or diols are known branching agents for thermoplastic polyesters, as discussed e.g. in US20120199515, US20070066719, and CA2694861. Carbon black is a known additive for enhancing heating rate of a preform to blowmoulding temperature (cf. e.g., WO2008008813).

Often the presence of additives in a base polymer is detrimental to the processing and mechanical properties of the final composition. For blowmoulded containers suitable for containing beverages, impact strength is quite important, since during handling (filling, storage, transportation), dropping of such bottles may happen through accidental mishandling. Because of this drop in mechanical properties, higher amounts of polymer are often used to thicken the containers walls, thus increasing proportionally the cost in raw materials, but also increasing the technical production problems associated with injection molding: preforms with thicker walls impact cycle time negatively with longer cooling times required to solidify the preforms, with associated formation of higher crystallinity. It follows that enhancing gas barrier properties of a thermoplastic polyester may increase considerably the cost of production of a container.

The choice of materials for the preforms and, ultimately, the blowmoulded container is quite delicate because the selected materials must fulfil the sometimes contradictory requirements imposed by the processing windows of both injection moulding for the production of the preforms, and blowmoulding for the production of the containers. Issues like melt viscosity, crystallinity, mollecular weight, melt temperature, blowmoulding temperature, must be addressed very carefully when selecting a material for blowmoulding thermoplastic containers. As shown in FIG. 1, blowmoulding a container from a thermoplastic preform is a multistage process comprising injection moulding a preform, heating said preform to blowmoulding temperature and blowmoulding the heated preform in a tool to form a container or bottle.

As a first step, a preform is produced by injection moulding or, in some cases, by extrusion. The preform may be formed of a single layer or, on the contrary, comprise several layers. The various layers can be formed by separate preform elements which are inserted into each other to form a multilayer preform assembly. An alternative process consists of simultaneous or sequential injection of successive layers on top of each other to yield an integral preform.

As a second step, the preform is heated, generally in an infrared (IR) oven to a blowmoulding temperature comprised between Tg and the melting temperature, Tm, of the preform material(s). Depending on the preform geometry (thickness) and residence time in the oven, it is possible that the temperature of the preform is locally in-homogenous, but theoretically. blowmoulding temperature is comprised between Tg and Tm. Again, wall thickness of the preform influence the blowmoulding process. First, higher energy is required to heat a thick wall preform. Second, the pressure required to blow a container out of a preform increases with the wall thickness of the preform. Third, temperature gradients are more likely to happen with thick wall preforms. All these effects can considerably affect the production cost of mass produced blowmoulded containers For injection moulding, it is also financially advantageous to lower the injection temperature, $T_{inj.m}$, in combination with lower injection pressures, $P_{inj.m}$, in terms of equipment investment and energy consumption. On the other hand, such parameters should not be optimized to the detriment of cycle time which is a serious economical factor in mass production of containers. Furthermore, the length to thickness ratio, L/T, of the injection moulding tool cavity is also of importance for the production of thin parts and thus of lighter preforms and, ultimately, lighter containers. Thicker parts may be easier to inject but longer to cool, to the extent that higher crystallinity develops at thick sections of a part, and longer cycle times are thus required. Preforms with excessive crystalinity can no longer be blowmoulded properly. The obvious answer to all the foregoing requirements is to lower the viscosity of the melt, by e.g., lowering the molecular weight of the thermoplastic polymer. This, however, is detrimental, (a) to the mechanical properties of the final container, since a polymer of low molecular weight is generally weak, and
(b) to the crystallinity of the preform since short chains are more mobile and tend to crystallize quicker. A preform having high crystallinity may be difficult to blowmould, since blowmoulding temperature is below melt temperature of the thermoplastic preform and crystals will not stretch to the rate imposed by blowmoulding.

For blowmoulding, it is also financially desirable to lower both blowmoulding temperature, $T_{blow.m}$, to reduce heat energy supplied per preform, and pressure, $P_{blow.m}$, as the costs associated with supplying high pressure air at a high rate during the blowmoulding operation is quite consequent. This is possible to achieve with thinner sections which require less time to heat and less energy to stretch. The wall thickness, however, is limited by the presence of certain additives and by the requirements of injection moulding, which include the use of low molecular weight polymers characterized by a low melt viscosity, known to yield, however, poor mechanical properties.

The cost of such high performance mass produced containers must be low because of its main consumer goods applications, whilst the properties thereof such as gas barrier properties and burst pressure must be optimized. The quadrature of the circle is rendered more complex yet by the sometimes contradictory process requirements during injection moulding of the preforms and blowmoudling of the containers. There therefore remains a need in the art for thermoplastic polyester compositions particularly suitable for food packaging, yielding blowmoulded containers having good barrier properties and concomitantly good mechanical properties producible cost-effectively. The present invention proposes a solution to such need.

SUMMARY OF THE INVENTION

The present invention is defined in the appended independent claims. Preferred embodiments are defined in the dependent claims. In particular, the present invention concerns a polyester composition suitable for food and beverage packaging, said polyester composition being obtained by blending:

(a) 90-97 wt. %, preferably 91-94 wt. % of a thermoplastic polyester selected from polyethylene terephthalate, polyethylene naphthalene, and mixtures thereof,
(b) 2-6 wt. %, preferably 3.0-5.5 wt. % of MXD6,
(c) 1 to 5000 ppm, preferably 1000-3500 ppm of a cobalt salt,
(d) 0.1-1000 ppm, preferably 20-500 ppm, more preferably 50-300 ppm ethylene glycol, and
(e) 0.1-1000 ppm, preferably 20-500 ppm, more preferably 50-300 ppm of pyromellitic dianhydride (PMDA).

In a preferred embodiment, the polyester composition further comprising carbon black in an amount comprised between 1 and 50 ppm, preferably between 5 and 40 ppm, more preferably, between 10 and 30 ppm. Carbon black is used for increasing the heating rate of the preform in an infrared oven prior to blowmoulding.

The polyester composition of the present invention is generally characterized by a low viscosity. For example, the intrinsic viscosity may be comprised between 0.4 and 0.7 dl/g, preferably between 0.5 and 0.65 dl/g, measured according to ASTM D4603. The dynamic melt viscosity may be lower than 100 Pa.s when measured at 265° C. at a shear rate of 1 rad/s between two rotating parallel plates The weight ratio of ethylene glycol to pyromellitic dianhydride (EG/PMDA) is preferably comprised between 0.05 to 2.0, more preferably between 0.08 and 1.5, most preferably between 0.2 and 1.3, in order to optimize and self-regulate the combined effect of both components.

The present invention also concerns single- or multi-layered preforms for blowmoulding a container, said preforms comprising an elongated body defining an inner volume and at one end of said elongated body, an opening defining a mouth, characterized in that at least one layer of said preform is made of a polyester composition as defined supra. Said preform are preferably produced by injection moulding.

The present invention also concerns blowmoulded single- or multi-layered containers comprising at least one layer made of a polyester composition as defined supra and obtained by blowmoulding the foregoing preforms. Such containers have good mechanical properties. For example, the burst pressure of a container according to the present invention may be the same or even higher that the burst pressure of a similar container made of 100 wt. % of the PET (a). In terms of specific burst pressure, relative to container weight (g) and capacity (l), it is preferably greater than 0.15 bar/g/l. With similar burst pressure resistance, a container according to the present invention may easily have an oxygen permeability less than 1% of the oxygen permeability of a container made of 100 wt. % of the PET (a).

The present invention also concerns a process for producing a polyester composition as defined supra, comprising blending in an extruder the following components and forming pellets:

(a) 90-97 wt. %, preferably 91-94 wt. % of a thermoplastic polyester selected from polyethylene terephthalate, polyethylene naphthalene, and mixtures thereof,
(b) 2-6 wt. %, preferably 3.0-5.5 wt. % of MXD6,
(c) 1 to 5000 ppm, preferably 1000-3500 ppm of a cobalt salt,
(d) 0.1-1000 ppm, preferably 20-500 ppm, more preferably 50-300 ppm ethylene glycol, and
(e) 0.1-1000 ppm, preferably 20-500 ppm, more preferably 50-300 ppm of pyromellitic dianhydride (PMDA).

Characterized in that, components (c), (d), and (e) are mixed to form a master batch added to the extruder separately from component (a). MXD6 is preferably also mixed with components (c) to (e) in said master batch. The pellets thus produced can be injection moulded as such to produce a preform as discussed supra. Said preform can then subsequently be heated in an infrared oven and blowmoulded to produce a container according to the present invention.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

The present invention concerns a thermoplastic polyester composition suitable for blowmoulding a container used, for example, for containing food and beverages. It comprises principally (a) a polyester, such as polyethylene terephthalate (PET), polyethylene naphthalene (PEN) and mixtures thereof. The composition of the present invention comprises between 90 and 97 wt. % of such polyester, preferably, between 91 and 94 wt. %. The polyester is blended with various additives. First, (b) MXD6 is present in an amount comprised between 2 and 6 wt. %, preferably between 3.0 and 5.5 wt. %, most preferably between 4.5 and 5.0 wt. %. MXD6 preferably has a 2.65 relative viscosity according to ISO 307 comprised between 1.0 and 3.0, preferably between 2.0 and 2.8, more preferably between 2.5 and 2.7. Examples of suitable MXD6 are MXD6-S6007 and S6003 available from Mitsubishi Corporation (MGC). MXD6 creates islands or domains within the polyester which greatly enhances gas barrier properties. To further enhance barrier properties to gases, the composition comprises (c) a cobalt salt in an amount comprised between 1 and 5000 ppm, preferably between 1000 and 3500 ppm, most preferably between 2000 and 3200 ppm. As discussed supra, cobalt salts act as active scavengers to oxygen. Examples of suitable cobalt salts comprise cobalt stearate, cobalt neo-deconoate, or other cobalt carboxylate, cobalt acetate, cobalt diacetate, of other polymeric salts of cobalt.

The gist of the present invention is to combine with the foregoing components both ethylene glycol (EG) and pyromellitic anhydride (PMDA). Both components can individually be present in an amount comprised between 0.1 and 1000 ppm, preferably between 50 and 300 ppm. The ethylene glycol to pyromellitic dianhydride contents ratio (EG/PMDA) can be comprised between 0.05 to 2.0, preferably between 0.08 and 1.5, more preferably between 0.2 and 1.3. Ethylene glycol is commonly used for the polycondensation of PET, but only seldom as an additive to a fully polymerized PET as is the case in the present composition. Similarly, PMDA is known as a branching agent, conveniently added during polycondensation of PET, but more rarely as an additive to a fully polymerized PET as is the case in the present composition.

Figure 2:
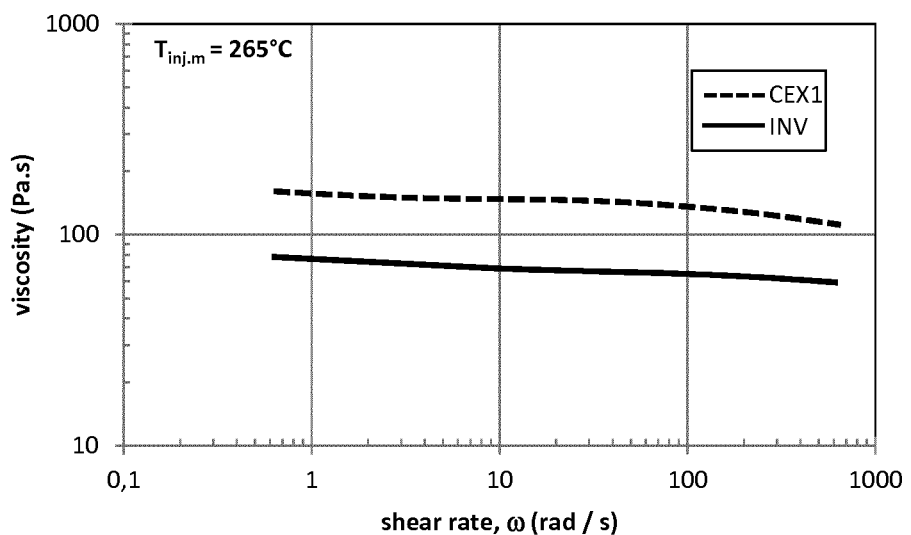
FIG. 2: shows the dynamic viscosity measured at a temperature of 265° C. by parallel plates rotating at a shear rate comprised between 0.1 and 1000 rad/s of a barrier composition of the prior art (=CEX1) and a composition according to the present invention (=INV).

FIG. 2 compares the dynamic melt viscosities of a composition listed in Table 1 according to the present invention (=INV, cf. solid line) and a commercial PET-based composition (=CEX1, cf. dashed line) marketed for its gas barrier properties and comprising polyamide and a cobalt salt. Dynamic viscosity was measured using parallel plates at a temperature of 265° C. and at a shear rate varying between 1 and 1000 rad/s. It can be seen that the composition according to the present invention (solid line) has a dynamic melt viscosity of the order of 80 to 90 Pa·s at a shear rate of 1 rad/s, which is substantially lower than the one of the commercial comparative example of the order of 180-200 Pa·s at 1 rad/s. Such difference in melt viscosity is confirmed by the intrinsic viscosity of the composition of the present invention comprised in the range of 0.55-0.65 against an intrinsic viscosity of CEX1 of the order of 0.78-0.80, so that it can be assumed with confidence that the molecular weight of the PET of the composition according to the present invention is lower than the one of PET in the comparative example. The low viscosity of the composition according to the present invention is not to be ascribed to the use of a PET grade having a particularly low molecular weight. Indeed, the PET grade used in the composition listed in Table 1 was the standard PET used as reference (cf. Table 1, left column) with an intrinsic viscosity of the order of 0.82 dl/g. Without wishing to be bound by any theory, it is believed that upon heating the composition, ethylene glycol favours polyester alcoholysis, which reduces molecular weight and thus both intrinsic and dynamic melt viscosities.

Table 1 lists the components of the composition according to the present invention and compares a number of process parameters and materials properties between a standard PET (=std PET), the commercial PET grade discussed supra (=CEX1) and a composition according to the present invention (=INV), comprising the PET of the standard PET. Two preforms were produced, one weighing 35 g and a second weighing 40 g for the same 1.5 l blowmoulded bottles of corresponding weights. The L/T ratios were 44.35 for the 35 g preform and of 40.58 for the 40 g preform, representing an increase in L/T ratio around 10% and significant weight reduction of around 12.5%. Injection moulding pressures were measured at the head of the screw. 1.5 l bottles were blowmoulded in the same mould from both 35 g and 40 g preforms at the blowmoulding temperatures and pressures indicated in Table 1. Physical properties include oxygen transmission rates measured on the blowmoulded bottles, showing that standard PET, with an $O_2$ transmission rate of the order of 100 ppb/day cannot be seriously contemplated for use as a bottle for storing an oxygen sensitive beverage, and special barrier grades PET compositions must necessarily be used instead (cf. FIG. 4). Note that intrinsic viscosity was measured on extruded pellets. Finally, burst pressure was measured on the blowmoulded bottles. The bottle is pressurized and must withstand a given pressure during at least 60 s. The pressure at which a bottle bursts after 60 s is the burst pressure.

TABLE 1 composition and properties of PET based compositions according to the prior art and to the present invention

Figure 3A:
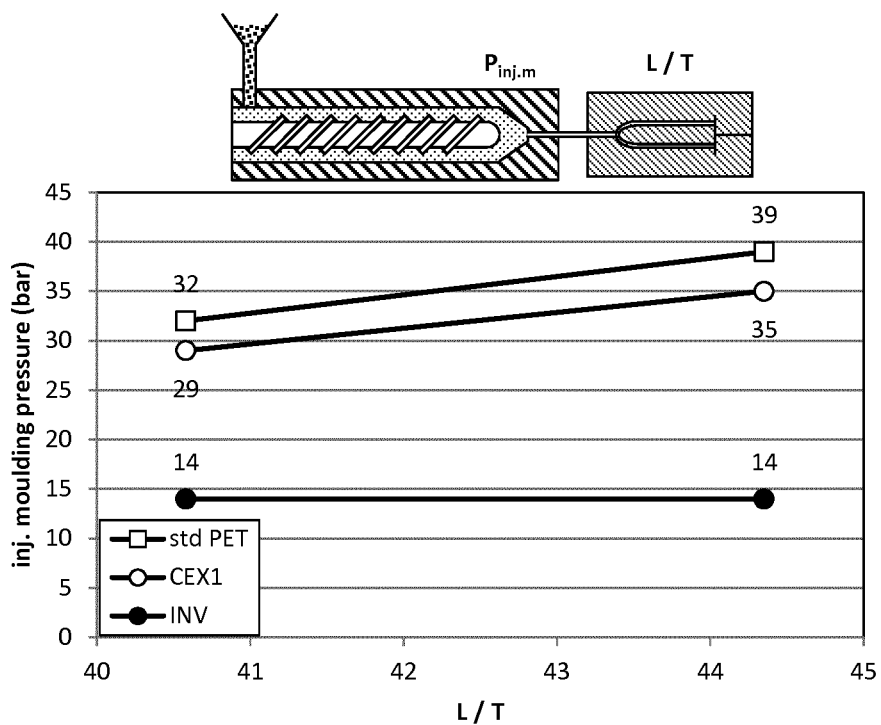
FIG. 3: shows the pressure applied during production of (a) a preform by injection moulding, and (b) of a bottle by blowmoulding.
Figure 3B:
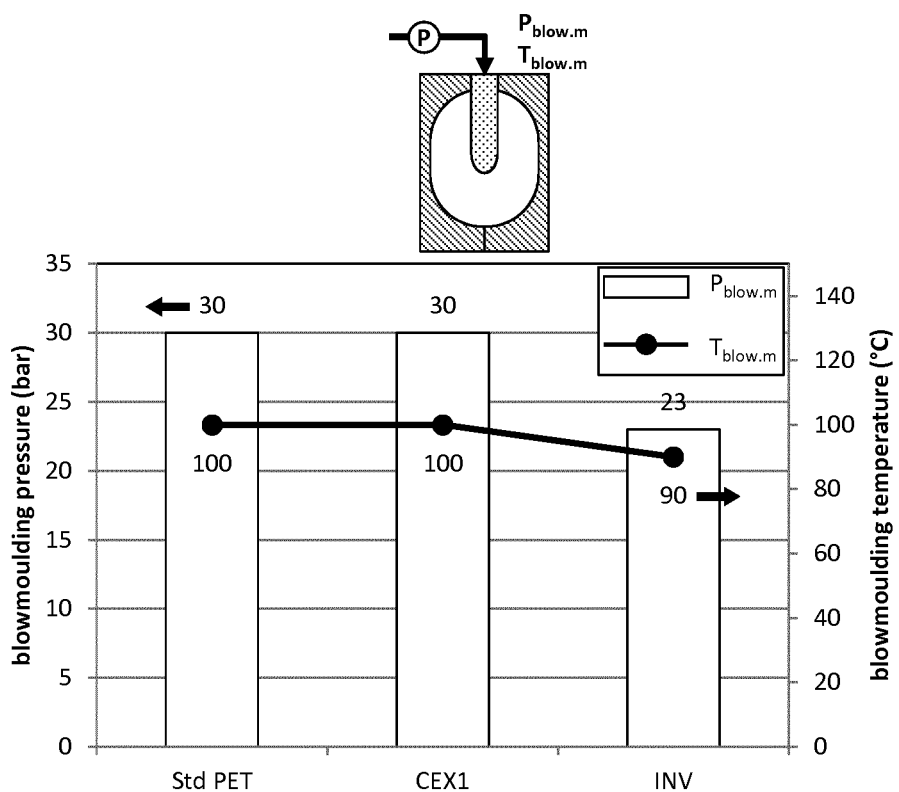

|  | std PET | CEX1 | INV |
|---|---|---|---|
| PET (wt. %) | 100 | >0[1] | 93.5 |
| MXD6 (wt. %) | 0 | >0[1] | 6 |
| Co stearate (ppm) | 0 | >0[1] | 3000 |
| Ethylene glycol (ppm) | 0 | NA[1] | 252 |
| PMDA (ppm) | 0 | NA[1] | 1000 |
| carbon black (ppm) | 0 | NA[1] | 28 |
| Injection moulding (FIG. 3(a)) | | | |
| $T_{inj.\,m}$ (° C.) | 265 | 265 | 265 |
| $P_{inj.\,m}$ (bar), m = 35 g | 39 | 35 | 14 |
| L/T, m = 35 g | 44.35 | 44.35 | 44.35 |
| $P_{inj.\,m}$ (bar), m = 40 g | 32 | 29 | 14 |
| L/T, m = 40 g | 40.58 | 40.58 | 40.58 |
| cycle time (s) | 26-27 | 26-27 | 21-22 |
| Blowmoulding: 1.5 l bottle (FIG. 3(b)) | | | |
| $T_{inj.\,m}$ (° C.) | 100 | 100 | 90 |
| $P_{blow.\,m}$ (bar) | 30 | 30 | 23 |
| Physical properties (FIGS. 2&4) | | | |
| intrinsic viscosity (dl/g) (extruded pellets) | 0.82-0.86 | 0.78-0.80 | 0.55-0.65 |
| dynamic melt viscosity (Pa · s) at T = 265° C. and ω = 1 rad/s | 200-250 | 180-200 | 80-90 |
| O2 transmission rate (ppb/day) m = 35 g | 121.5 | 0.1 | 0.2 |
| O2 transmission rate (ppb/day) m = 40 g | 93.5 | 0.1 | 0.7 |
| Mechanical properties (FIG. 5) | | | |
| burst pressure (bar), m = 35 g | 7.1 | 7.1 | 8.1 |
| burst pressure (bar), m = 40 g | 9.9 | 8.2 | 10.2 |
| specific burst pressure (bar/g/l), m = 35 g/m = 40 g | 0.14/0.17 | 0.14/0.14 | 0.15/0.17 |

Figure 4:
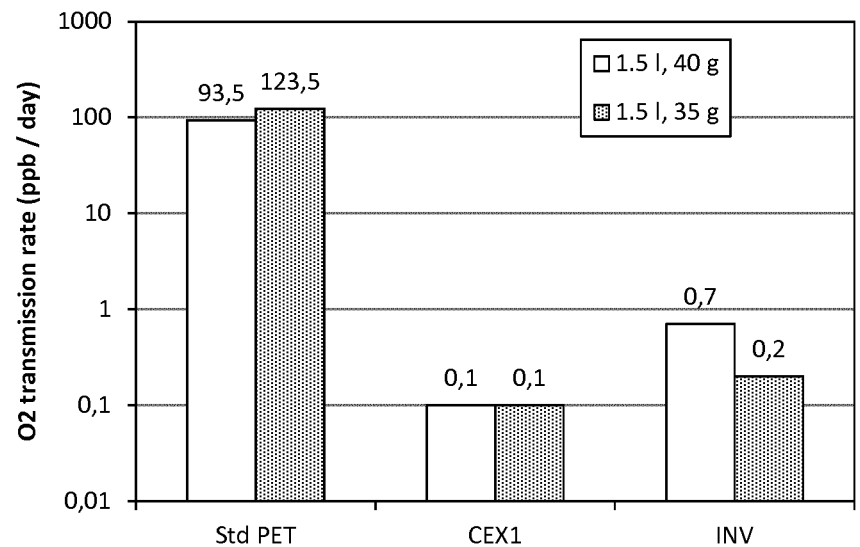
FIG. 4: shows the permeability to oxygen of a pure PET (std PET), a PET of the prior art with oxygen barrier (=CEX1), and a PET composition according to the present invention (=INV) for a bottle of 1.5 l capacity and weighing 40 g (=white columns) and 35 g (=shaded columns).
Figure 5:
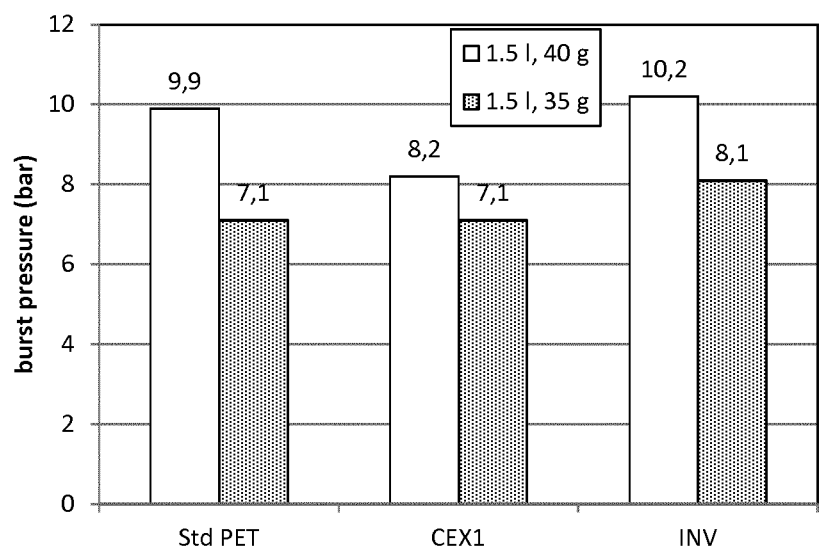
FIG. 5: shows the burst pressure of a pure PET (std PET), a PET of the prior art with oxygen barrier (=CEX1), and a PET composition according to the present invention (=INV) for a bottle of 1.5 l capacity and weighing 40 g (=white columns) and 35 g (=shaded columns).

[1]The composition of the commercial product CEX1 is not known or cannot be disclosed FIG. 4 illustrates the transmission rate of oxygen measured on the various PET compositions using a MOCON Transmission Analysis System. Blowmoulded bottles were tested according to ASTM F1307. Standard PET yields an inadmissible $O_2$ transmission rate of the order of 100 ppb/day (note that the axis of the ordinate is defined by a logarithmic scale). Not surprisingly he commercial barrier PET (=CEX1) and the composition according to the present invention (=INV) both have a commercially acceptable permeability to oxygen, which is two to three orders of magnitude lower than the one of standard PET.

The melt viscosity of compositions according to the present invention is relatively low compared with prior art polyester compositions, and is preferably below 100 Pa·s when measured at 265° C. at a shear rate of 1 rad/s between two rotating parallel plates. The intrinsic viscosity, which is not temperature dependent, is preferably comprised between 0.4 and 0.7 dl/g, preferably between 0.5 and 0.65 dl/g. (according to ASTM D4603)]. As discussed in the introductory part, low melt viscosity is advantageous from a process point of view, since lower pressures are required for injection moulding a preform and higher L/T ratios can be reached. With high L/T ratios, thinner parts can be injected and cooled more rapidly thus reducing cycle times as well as the amount of raw material used. Containers blowmoulded from low molecular weight preforms (as suggested by the low intrinsic viscosities measured on extruded granules) would, however, normally be considered as undesirable because they would have insufficient mechanical properties such as burst resistance. Surprisingly, the bottles comprising the PET composition of the present invention yield better mechanical properties than the commercial prior art comparative example, CEX1, as can be appreciated in FIG. 5. The burst pressure of 10.2 bar reached by the 40 g bottles according to the present invention is the highest value, and the burst pressure of 8.1 bar of a 35 g bottle according to the present invention is similar to the burst pressure of 8.2 bar reached by the 40 g bottle made with the commercial comparative composition (CEX1). A specific burst pressure can be defined per unit weight and unit volume of the container. Table 1 reports the specific burst pressure of the three types of containers tested, showing that the container made of a commercial gas-barrier polyester (=CEX1) yields a rather low 0.14 bar/g/l, against 0.15 and 0.17 bar/g/l obtained for a container according to the present invention, even slightly higher than the one measured on a standard PET container of 0.14 and 0.17 bar/g/l.

Without wishing to be bound by any theory, it is believed that these totally counter-intuitive burst test values are the result of the action of EG which reduces the polymer chain length and PMDA which creates a dense branching network and thus increases the yield strength of the containers after blowmoulding. The combined effect of ethylene glycol in fomenting alcoholysis during injection moulding and of PMDA increasing branching of the polymer in the final product allows an optimisation of both process and mechanical parameters. Such combined effect is not, however, a mere juxtaposition of the effects of each of EG and PMDA. Indeed, there is an auto-regulation between the two components which can also react together to form an ester according to the following assumed reaction:

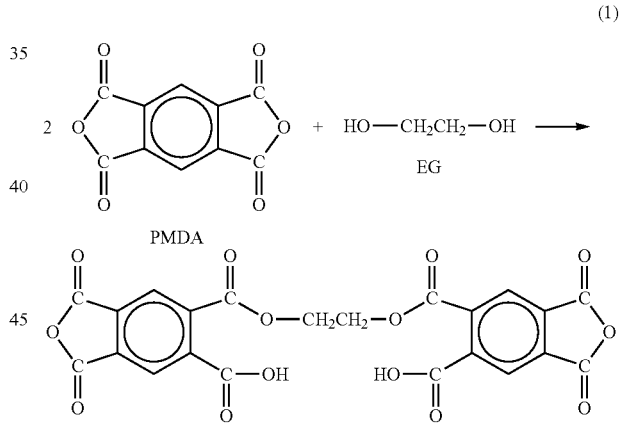

(1)

The equilibrium of the above reaction can be controlled by the contents of PMDA and EG in the composition and the reaction kinetics by the temperature. It was observed that good balance of the effects associated with EG and PMDA could be obtained with an ethylene glycol to pyromellitic dianhydride contents ratio (EG/PMDA) comprised between 0.5 to 2.0, preferably between 0.8 and 1.5, more preferably between 1.0 and 1.3. This accounts for the auto-regulation reaction defined above, wherein excess of EG and PMDA form an ester, thus limiting both alcoholysis and branching reactions to yield optimal low viscosity during injection moulding of the preform, and high mechanical properties of the blowmoulded containers. Furthermore, it is believed that either PMDA or, more probably the ester resulting from the reaction of PMDA with EG controls and maintains at a low level the crystallization rate of the polyester during cooling of the preform in the injection moulding tool and during heating in the infrared oven prior to blowmoulding. Furthermore, the dense branching network created by the combination of EG and PMDA throughout the matrix is believed to inhibit the formation of perfect crystalline domains especially of nylon. This would create a scattered network of crystalline lamellae forming much diffused interface between nylon and PET polymers, Such unusual diffused network gives very strong interfacial bonding, probably by inter-penetration and interlocking of nylon and PET crystalline lamelae. This mechanism could explain the higher mechanical properties in combination with barrier properties observed in containers according to the present invention, while delivering overall processing advantage. It is also believed that either component acts as plasticizer, which facilitates both injection moulding and blowmoulding operations.

Figure 1:
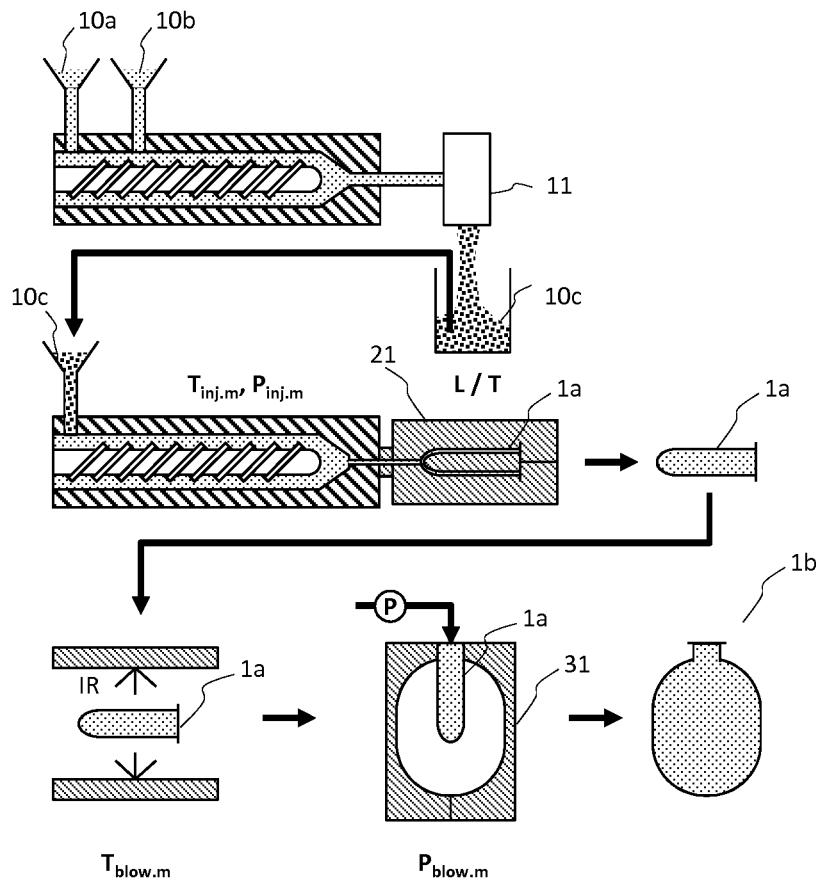
FIG. 1: illustrates the various steps of blowmoulding a thermoplastic container according to the present invention.

As illustrated in FIG. 1, pellets (10c) made of a polyester composition the present invention can be produced by adding separately in an extruder and blending 90-97 wt. % of a thermoplastic polyester (10a) in the form of pellets selected from polyethylene terephthalate, polyethylene naphthalene, and mixtures thereof, with a master barch (10b) batch comprising:
    0.1-1000 ppm ethylene glycol,
    1-5000 ppm of a cobalt salt, and
    0.1-1000 ppm of pyromellitic dianhydride (PMDA),
wherein the wt. % are expressed in terms of the total weight of the composition. MXD6 may be blended with either the polyester or incorporated in the master batch prior to extrusion. It can also be distributed in both polyester and master batch. The whole amount of MXD6 is preferably incorporated in the master batch (10b).

The extrudate is chopped into pellets (10c) in a chopper (11) and collected. Said pellets (10c) can be inserted as such into an injection moulding equipment for injection moulding of a preform (1a) in a tool (21). Because of the low viscosity of the composition of the present invention, preforms with thin walls and high L/T values can be produced. The preforms (1a) are then heated in an infrared oven (IR) to blowmoulding temperature, and then transferred to a tool (31) in pressurized gas injected into the interior of the heated preforms to blowmould them in the tool to form a hollow container (1b) of desired geometry.

Alternatively, it is possible to blend the polyester (10a) and master batch (10b) directly in the screw chamber of the injection moulding machine, thus by-passing the extrusion and pelletization steps. This solution, though appealing at first sight, must be handled with much care, since blending in an extrusion machine, in particular if provided with twin screws, is more efficient than blending the components directly in the screw chamber of an injection machine, and insufficient homogeneity may be obtained. Furthermore, bypassing the extrusion stage eliminates the first thermal cycle undergone by the composition during which reactions, such as alcoholysis, reaction (1) between EG and PMDA, and some branching of the polyester, may occur. Absent said first thermal cycle, the concentrations of the various components and temperature profiles during the injection moulding and blowmoulding may have to be amended slightly in order to yield a bottle with optimal properties.

As mentioned above, the master batch (10b) may also comprise part or the whole of MXD6 to be present in the final composition. Carbon black can also be incorporated in the master batch. Carbon black is used to increase the heating rate of the preforms in an infrared oven prior to blowmoulding. Carbon black may be present in an amount comprised between 1 and 50 ppm, preferably between 5 and 40 ppm, more preferably, between 10 and 30 ppm, wherein the ppm-amounts are expressed in terms of the total weight of the final composition including PET.

Depending on the type of polyester used, the temperature of the extruder chamber may advantageously be comprised between 255 and 300° C., preferably between 260 and 280° C. when PET is used, and between 270 and 310° C. when PEN is used. Similarly, the injection moulding screw-chamber can be heated at the same temperature ranges as for extrusion. The blowmoulding temperatures, on the other hand, can be comprised between 100 and 120° C., when PET is used, preferably between 85 and 100° C.; or more preferably between 90 and 98° C., and between 90 and 95° C. when PEN is used. (again, intermediate temperatures may be used for PET/PEN blends).

The preforms produced by injection moulding may be single layer or, on the contrary, comprise more than one layer, typically two layers. Two- or more-layer preforms can be produced either by injection moulding each layer successively on top of one another directly in the same tool to yield an integral preform. Alternatively, each layer can be injection moulded individually, and thereafter assembled by nesting one into another. In case of a multi-layer preform, one layer only may be made of the composition of the present invention. Alternatively, more than one, and possibly all the layers, may be made of a composition according to the present invention. The number of layers made of a composition according to the present invention will greatly depend on the desired final gas barrier properties. The container can be a bag-in-container, wherein the liquid to be dispensed is contained in a collapsible inner bag contained within an outer container. By injection of a pressurized gas (usually air) in the space between inner bag and outer container, the inner bag is compressed and collapsed, forcing the liquid out of the container. The outer container may require barrier properties to prevent ingress of air into the container. The inner bag may require barrier properties to prevent carbon dioxide from egressing from a carbonated beverage and pressurized gas injected in the space between inner and outer container from entering into the bag and contact the liquid.

By the combination of traditional barrier additives such as MXD6 and cobalt salts with a self-regulating dual system comprising ethylene glycol (EG) and pyromellitic dianhydride (PMDA), a polyester composition having the following advantageous properties is obtained:
    (a) Good gas barrier properties (cf. FIG. 4),
    (b) Low melt viscosity during injection moulding (cf. FIG. 2), allowing
        (i) Low injection moulding pressures (cf. FIG. 3(a)),
        (ii) parts with high L/T ratios to be produced at low pressure, thus reducing the weight of raw material used as well as the cooling time and crystallization of the preforms (cf. FIG. 3(a)),
    (c) Good mechanical properties such as burst pressure, even with containers blowmoulded at a lower temperature and pressure (cf. FIGS. 3(b) and 5).

The good gas barrier and mechanical properties obtained with containers produced with such cost-effective processing conditions (lower $P_{inj.m}$, higher L/T, lower $P_{blow.m}$ and $T_{blow.m}$) constitute a technical and economical breakthrough in the field of containers for food and beverage conservation. The low melt viscosity of the polymer upon injection moulding (which would normally be considered as yielding insufficient mechanical properties) is advantageous in that it reduces shear on the material during injection moulding. This of course reduces wear rate of the expensive tools, but from a material point of view it is also believed to limit formation of unwanted by products like acetaldehyde. All the advantages of the present invention summed up permit substantial production costs reductions of containers to be achieved while maintaining high values of the mechanical and gas barrier properties.

The invention claimed is:

1. A polyester composition suitable for food and beverage packaging, said polyester composition obtained by blending:
   (a) 90-97 wt. % of a thermoplastic polyester selected from polyethylene terephthalate, polyethylene naphthalene, and mixtures thereof,
   (b) 2-6 wt. % of MXD6,
   (c) 1-5000 ppm of a cobalt salt,
   (d) 0.1-1000 ppm ethylene glycol (EG), and
   (e) 0.1-1000 ppm of pyromellitic dianhydride (PMDA).

2. The polyester composition according to claim 1, further comprising carbon black in an amount comprised between 1 and 50 ppm, preferably between 5 and 40 ppm, more preferably, between 10 and 30 ppm.

3. The polyester composition according to claim 1, having an intrinsic viscosity comprised between 0.4 and 0.7 dl/g, preferably between 0.5 and 0.65 dl/g measured according to ASTM D4603.

4. The polyester composition according to claim 1, having a dynamic melt viscosity lower than 100 Pa.s when measured at 265° C., at a shear rate of 1 rad/s between two rotating parallel plates.

5. The polyester composition according to claim 1, wherein the amount of one or several of the compounds (a) to (e) used in the blend is comprised in an amount of:
   (a) 91-94 wt. % of a thermoplastic polyester selected from polyethylene terephthalate, polyethylene naphthalene, and mixtures thereof,
   (b) 3.0-5.5 wt. % of MXD6,
   (c) 1000-3500 ppm of a cobalt salt,
   (d) 50-300 ppm ethylene glycol (EG), and/or
   (e) 50-300 ppm of pyromellitic dianhydride (PMDA).

6. The polyester composition according to claim 1, wherein the ethylene glycol to pyromellitic dianhydride contents ratio (EG/PMDA) is comprised between 0.05 and 2.0, more preferably between 0.08 and 1.5, most preferably between 0.2 and 1.3.

7. A single- or multi-layered preform for blowmoulding a container, said preform comprising an elongated body defining an inner volume and at one end of said elongated body, an opening defining a mouth, characterized in that at least one layer of said preform is made of a polyester composition according to claim 1, the preform being preferably produced by injection moulding.

8. A blowmoulded single- or multi-layered container comprising at least one layer made of a polyester composition obtained by blending:
   (a) 90-97 wt. % of a thermoplastic polyester selected from polyethylene terephthalate, polyethylene naphthalene, and mixtures thereof,
   (b) 2-6 wt. % of MXD6,
   (c) 1-5000 ppm of a cobalt salt,
   (d) 0.1-1000 ppm ethylene glycol (EG), and
   (e) 0.1-1000 ppm of pyromellitic dianhydride (PMDA) and obtained by blowmoulding a preform according to claim 7.

9. The container according to claim 8 having a burst pressure relative to the weight and capacity of said container which is greater or equal to the one of a container made of 100 wt. % of the PET (a) and which is preferably greater than 0.15 bar/g/l.

10. The container according to claim 9, having an oxygen permeability less than 1% of the oxygen permeability of a container made of 100 wt. % of the PET (a).

11. A process for producing a polyester composition, comprising blending in an extruder the following components and forming pellets:
    (a) 90-97 wt. % of a thermoplastic polyester selected from polyethylene terephthalate, polyethylene naphthalene, and mixtures thereof,
    (b) 2-6 wt. % of poly-m-xylidene (MXD6),
    (c) 0.1-1000 ppm ethylene glycol,
    (d) 1-5000 ppm of a cobalt salt, and
    (e) 0.1-1000 ppm of pyromellitic dianhydride (PMDA),
    wherein components (c), (d), and (e) are mixed to form a master batch added to the extruder separately from component (a).

12. The process according to claim 11, wherein MXD6 is also mixed with components (c) to (e) to form a master batch.

13. The process according to claim 11, wherein the composition obtained is injection moulded to produce a a single or multi-layered preform for blowmoulding a container, said preform comprising an elongated body defining an inner volume and at one end of said elongated body, an opening defining a mouth, characterized in that at least one layer of said preform is made of a polyester composition obtained by blending:
    90-97 wt. % of a thermoplastic polyester selected from polyethylene terephthalate, polyethylene naphthalene, and mixtures thereof,
    2-6 wt. % of MXD6,
    1-5000 ppm of a cobalt salt,
    0.1-1000 ppm ethylene glycol (EG), and
    0.1-1000 ppm of pyromellitic dianhydride (PMDA)
    wherein the preform is produced by injection moulding.

14. The process according to claim 13, wherein the preform obtained is blowmoulded to produce a a single- or multi-layered container comprising at least one layer made of a polyester composition obtained by blending:
    (a) 90-97 wt. % of a thermoplastic polyester selected from polyethylene terephthalate, polyethylene naphthalene, and mixtures thereof,
    (b) 2-6 wt. % of MXD6,
    (c) 1-5000 ppm of a cobalt salt,
    (d) 0.1-1000 ppm ethylene glycol (EG), and
    (e) 0.1-1000 ppm of pyromellitic dianhydride (PMDA).

* * * * *